United States Patent [19]

Kopaska

[11] 4,273,036
[45] Jun. 16, 1981

[54] MACHINE FOR ROLLING CROPS INTO ROUND BALES

[76] Inventor: Arnold F. Kopaska, Guthrie Center, Iowa 50115

[21] Appl. No.: 155,551

[22] Filed: Jun. 2, 1980

Related U.S. Application Data

[60] Continuation of Ser. No. 914,005, Jun. 9, 1978, abandoned, which is a division of Ser. No. 704,173, Jul. 12, 1976, Pat. No. 4,121,513.

[51] Int. Cl.³ .............................................. B30B 5/06
[52] U.S. Cl. ...................................... 100/88; 56/341; 474/133
[58] Field of Search .......................... 100/88, 89, 76, 5; 56/341–344; 74/592; 474/101, 109, 113, 133, 132, 135

[56] References Cited

U.S. PATENT DOCUMENTS

| | | | |
|---|---|---|---|
| 1,430,467 | 9/1922 | Peck | 74/592 |
| 3,245,277 | 4/1966 | Ward | 474/135 X |
| 3,262,330 | 7/1966 | Cheatum | 474/135 X |
| 4,016,712 | 4/1977 | Gaeddert et al. | 56/341 |

FOREIGN PATENT DOCUMENTS 436587 7/1948 Italy .

*Primary Examiner*—Peter Feldman
*Attorney, Agent, or Firm*—Schmidt, Johnson, Hovey & Williams

[57] ABSTRACT

The machine forms bales of circular cross section by continuously rolling the bale upon a supporting surface within a formation chamber while additional material is supplied to the chamber. The chamber is partially defined by two separate, cooperating sets of flexible belts, one set having an upwardly moving stretch at the rear of the chamber and the other having a forwardly moving stretch defining the top of the chamber such that material entering the chamber at the beginning of the baling cycle is lifted upwardly by the rear stretch and rolled forwardly by the top stretch. The top and rear stretches converge to an upper rear corner of the chamber spaced above the supporting surface for the rolling bale, and such corner may be adjustably shifted vertically and/or horizontally in a fore-and-aft direction as may be necessary or desirable to facilitate bale starting under differing crop conditions. Alternative belt arrangements are disclosed for obtaining the desired adjustability of the chamber corner. An improved belt-tensioning assembly is also disclosed wherein spring tension on the belts is rendered substantially constant throughout the full movement of swinging arms that control and take up slack in the belts.

3 Claims, 10 Drawing Figures

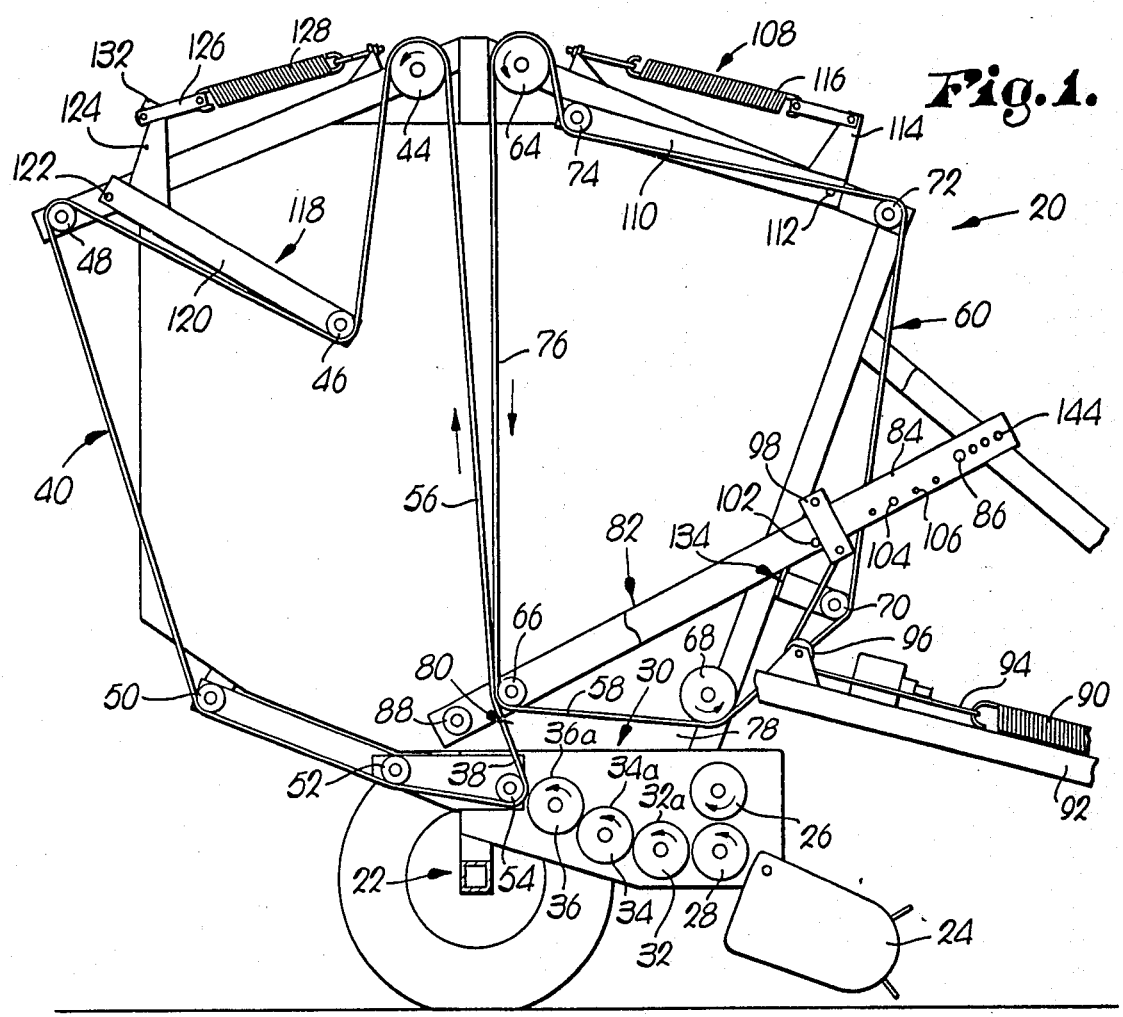
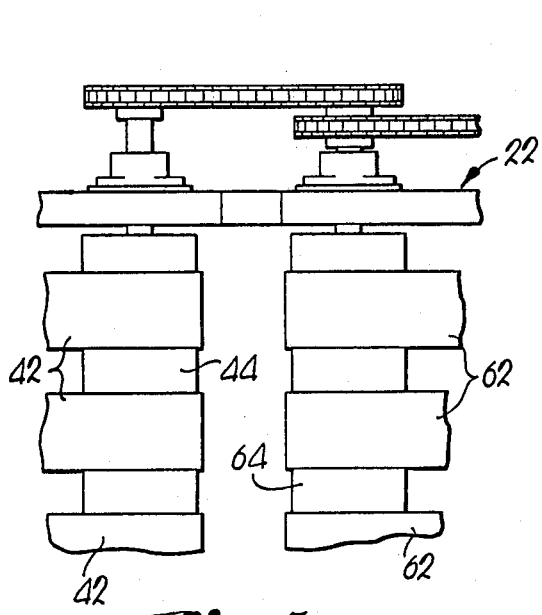
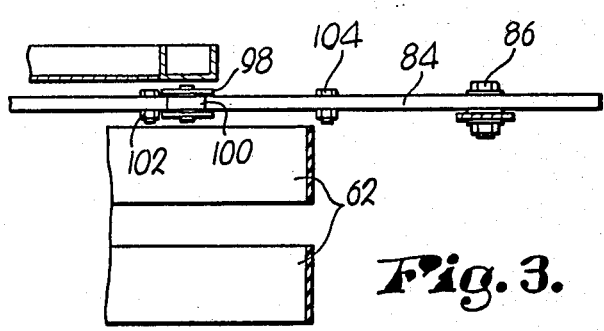
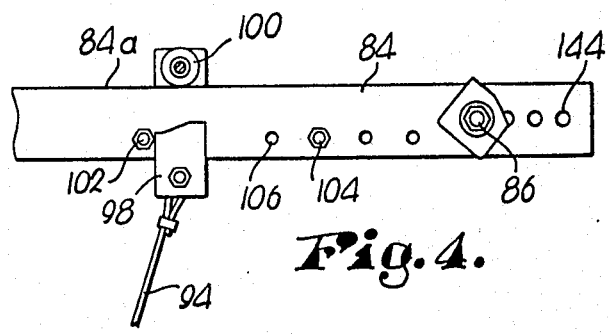

MACHINE FOR ROLLING CROPS INTO ROUND BALES

This is a continuation of Ser. No. 914,005 filed on June 9, 1978 titled "Machine for Rolling Crops into Round Bales", now abandoned, which is a division of Ser. No. 704,173, filed July 12, 1976, now U.S. Pat. No. 4,121,513.

This invention relates broadly to balers and, more particularly, to that class of baling machines which is devoted to the formation of large cylindrical hay bales on the order of one ton or more, such bales being typically referred to as "round" bales.

In the formation of such bales, many conventional machines feed picked-up material rearwardly into a formation chamber which is bounded at the bottom by either a flat, rearwardly moving apron or a series of parallel, transversely disposed rollers rotating in a direction to urge the material rearwardly. Once in the chamber at the beginning of the baling cycle the material encounters an upwardly and forwardly inclined web which lifts the material from the floor of the chamber and tumbles it forwardly on top of the incoming material so as to begin coiling up the bale. While, generally speaking, this results in the formation of a suitable bale, problems have been encountered because of the relatively sharp angle presented at the rear of the chamber where the inclined web intersects the floor of the chamber. All too frequently incoming material wedges tightly between the floor and the web at the sharp corner or "pinch point" defined between the two moving structures instead of tumbling upwardly and forwardly in the intended manner. Hence, the machine operator is faced with the laborious, time-consuming and irritating task of stopping the machine in the middle of the baling program to dig out the wedged material.

Some currently commercially available machines, such as these illustrated for example in U.S. Pat. No. 3,815,345, issued to Mast et al, on June 11, 1974, are provided with guide means which hold the inclined web at a relatively steep angle with respect to the floor of the chamber during bale starting so that the aforementioned problem is not so severe. However, it has been found that even in machines of this type, difficulties can be encountered as a result of varying crop conditions. For example, heavy, damp hay has entirely different starting characteristics than relatively dry, light hay, while the same can be said when comparing hay on the one hand with straw and/or corn stover on the other hand. In accordance with the present invention it has been discovered that such variations in crop conditions and crop types can be fully accommodated provided that the shape of the formation chamber, in particular the area adjacent the rear of the chamber, can be varied at the time of bale-starting so as to arrive at a configuration best suited for the particular crop and condition at hand.

Accordingly, one important object of the present invention is to obtain improved bale-starting over machines heretofore available, but without sacrificing quality in the finished bale.

Pursuant to the foregoing, another important object of the present invention is to eliminate the sharp angle or corner found at the lower rear end of many conventional chambers in favor of a more nearly upright chamber wall at that location which blocks incoming material from further rearward travel and at the same time forcefully lifts such material to an overhead, forwardly moving wall of the chamber that tumbles the material into a coil.

An additional important object of this invention is to obtain a formation chamber having the characteristics described above which may be readily adjusted in height at the rear of the chamber in order to compensate for variations in crop conditions and crop types.

A still further important object of the present invention is to provide a way of adjustably varying the length of the top of the chamber to account for variations in crop conditions and crop types.

Yet another important object of the present invention is to provide a way of using conventional springs to tension forming belts of the machine without the drawback of having the springs load the belt with increasingly greater force as the springs are stretched toward their limits, such a provision thereby permitting the growing bale to be subjected to substantially uniform compressive forces from the belts throughout the baling cycle.

In the drawings:

FIG. 1 is a schematic, vertical cross-sectional view of a machine constructed in accordance with the principles of the present invention, the machine being illustrated in a condition for starting the next bale;

FIG. 3 is an enlarged, detail view of an improved belt-tensioning assembly utilized in the machine;

FIG. 4 is a fragmentary, side elevational view thereof;

FIG. 5 is an enlarged, top plan view of guide rollers adjacent the top of the machine illustrating the way in which forming belts of the two separate belt systems are looped about the two separate members at that location;

Figure 2:
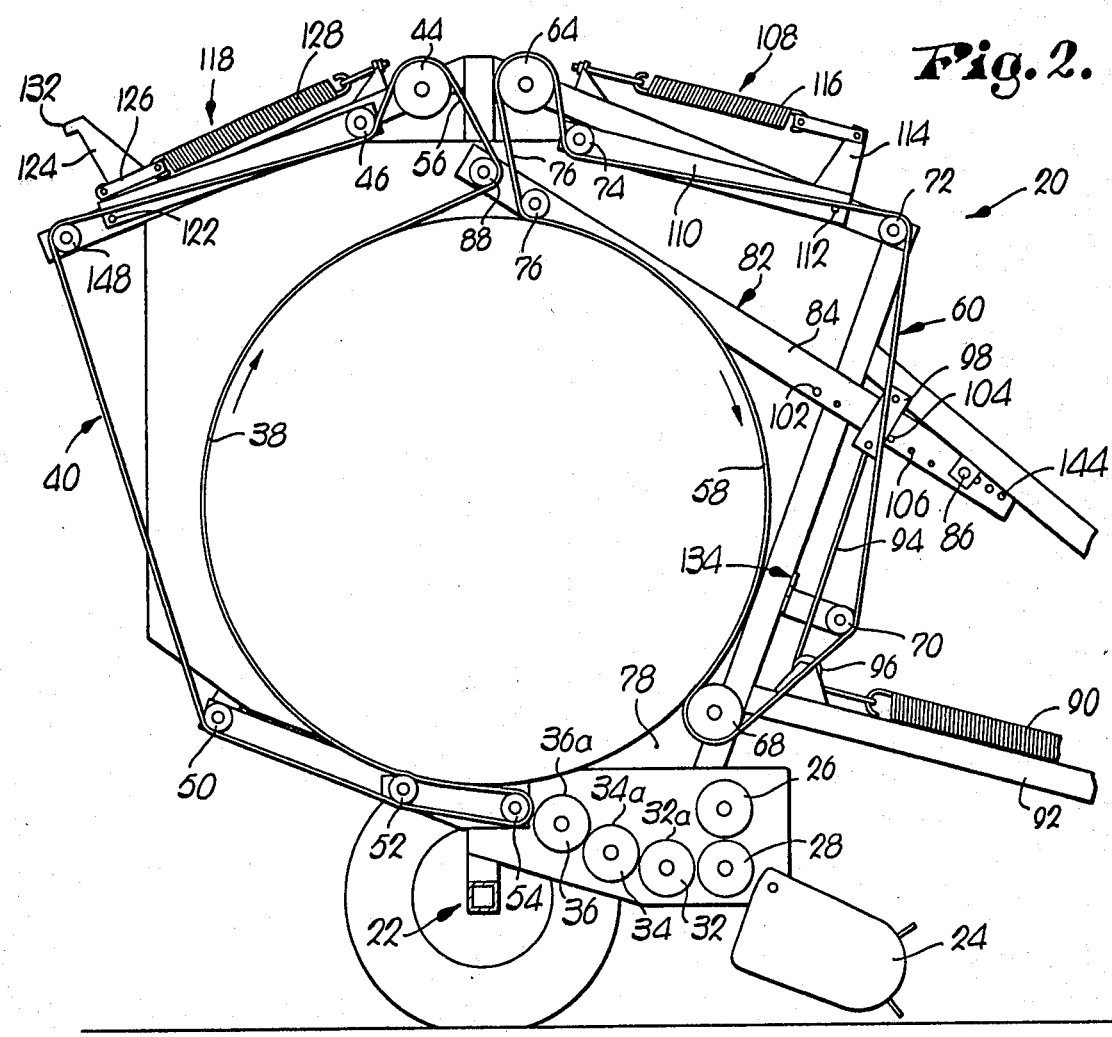
FIG. 2 is a view of the machine similar to FIG. 1 but illustrating the condition thereof when a bale has reached full size.

The machine 20 of FIGS. 1–7 includes a wheeled chassis 22 that adapts the machine 20 for advancement across a field having crop material lying thereon. A crop pickup 24 at the front of chassis 22 lifts the material from the ground and directs it rearwardly between a pair of oppositely rotating compression rollers 26 and 28 which, in turn, feed the compressed material rearwardly into an expandable formation chamber broadly denoted by the numeral 30.

A series of transversely extending, parallel and side-by-side rollers 32, 34 and 36 define the floor of the chamber 30 and have arcuate top peripheries 32a, 34a and 36a which serve to engage and support material presented to the chamber 30 by the pickup 24, the rollers 32–36 being driven in a counterclockwise direction (as shown in FIG. 1) by means not illustrated but clearly understood in the art.

The rear wall of the chamber 30 is defined by a generally upright web stretch 38 forming a part of a first endless, rear web 40 which may conveniently be defined by a plurality of laterally spaced, flexible belts 42 as illustrated in FIG. 5. The web 40 is looped about a counterclockwise-driven roller 44 at the top of the chassis 22 and thence about a series of idlers 46, 48, 50, 52 and 54, the idler 54 being disposed at the rear of the chamber 30 defining substantially the lower termination of the stretch 38. An additional web stretch 56 extends upwardly from stretch 38 as a continuation thereof to the large driven roller 44.

The top of the chamber 30 is defined by a generally horizontal, fore-and-aft extending web stretch 58 forming a part of a second continuous web 60 separate and apart from the rear web 40. The web 60 may conveniently be defined by a series of laterally spaced-apart belts 62 as illustrated in FIG. 5. The web 60 is looped about a counterclockwise driven roller 64 adjacent the top of the chassis and immediately in front of the roller 44, thence about an idler 66, another counterclockwise driven roller 68, and idlers 70, 72 and 74. Leading upwardly from stretch 58 as a continuation thereof, is a second web stretch 76 which runs in close fore-and-aft proximity to the corresponding web stretch 56 of the rear web 40.

The chamber 30 is of course further defined by opposite side panels of the machine, one only being shown herein and denoted by the numeral 78. In any event, the stretches 38 and 58 converge upwardly and rearwardly to define an upper rear corner 80 of the chamber 30 spaced substantially above the floor of the latter as presented by the rollers 32–36. Such corner 80 is maintained in the chamber 30 when the machine is in condition for bale-starting (as shown in FIG. 1) by a vertically swingable retainer 82 having a pair of arms 84 (one only being shown) against opposite interior surfaces of the side panels 78. The arms 84 are pivoted at their forwardmost ends to the chassis by pins 86, while the idler 66 spans the arms 84 adjacent their rearmost ends. An additional idler 88 spans the arms 84 at a position slightly further rearwardly than the idler 66, and the two webs 40 and 60 are received between the idlers 66 and 88. The retainer 82 is biased yieldably downwardly toward the rollers 32, 34 and 36 by one or more coil springs 90 which lie along the forwardly extending tongue 92, each spring 90 being coupled with the retainer 82 through a cable 94 looped under a pulley 96 and attached to a collar 98 that receives the corresponding arm 84. Thus, the retainer 82 maintains the corner 80 when the chamber 30 is in its bale-starting configuration as illustrated in FIG. 1, at which time the chamber 30 is somewhat rectangular in cross section.

Each collar 98 is coupled with its arm 84 in such a way that the force of the spring 90 biasing the arm 84 downwardly can increase only to a predetermined level as the arm 84 swings upwardly to a fully raised position as illustrated in FIG. 2. That is, at a selected point in the path of travel of the arm 84, the force of the spring 90 can become no greater than that which exists at that point, regardless of the fact that the arm 84 will be swung further upwardly to its fully raised position.

This becomes important because it is generally desirable to have significant spring pressure at the beginning of the baling cycle so as to produce a tight core for the bale. However, springs inherently are incapable of applying the same degree of pressure throughout their full compression or extension loading, and thus if a relatively substantial amount of pressure is applied at the beginning of the cycle, the pressure in the latter portion of the cycle will be quite excessive, unless provisions are made in accordance with the principle now to be described.

Specifically, each collar 98 loosely embraces its arm 84 and, as shown in detail in FIGS. 3 and 4, is provided with an antifriction roller 100 that engages the top edge 84a of the arm 84 to facilitate movement of the collar 98 along arm 84 during certain portions of the swinging cycle of the arm 84. A pair of limit stops 102 and 104 are desirably provided at longitudinally spaced locations on the arm 84 for the purpose of determining the opposite extremes of travel of the collar 98, such stops 102 and 104 conveniently taking the form of bolt and nut units which may be selectively inserted into any one of a number of holes 106 along the arm 84.

The cable 94, inasmuch as it is looped beneath the pulley 96 which is almost directly beneath the collar 98, approaches the arm 84 transversely of the latter such that the force from spring 90 is likewise disposed transversely of the arm 84. Consequently, when the arm 84 is raised such as by a bale growing in the chamber 30 toward its full size as illustrated in FIG. 2, the spring 90 is initially stretched until the arm 84 reaches such a position that the force of spring 90 pulls the collar 98 along the arm 84 toward pivot 86, such movement of the collar 98 being permitted until it engages the stop 104. It will be recognized that this shifting of the "anchor point" of the cable 94 on the arm 84 decreases the moment arm between the pivot 86 and such anchor point during the latter portion of the swinging movement of arm 84 such that the spring 90 is not further stretched. Hence, the spring pressure against arm 84 during such interval remains substantially unchanged.

The retainer 82 serves as the primary tensioning structure for the web 60; however, a secondary tensioning assembly 108 is also provided along the top of the machine 20 slightly forwardly of the roller 64. The assembly 108 is of conventional construction, having arms 110 (one only being shown) that carry the idler 74 and are swingably mounted on the chassis 22 by a forward, transverse pivots 112. An upstanding crank 114 on each arm 110, respectively, adjacent its pivot 112, serves as an anchor point for a tension spring 116 which, at its rearmost end, is anchored to the chassis 22, thereby yieldably biasing the arm 110 downwardly to maintain tension against the web 60.

The tension of the rear web 40 is controlled by an assembly 118 which, in principle, is quite similar to the tensioning aspects of the retainer 82. The assembly 118 includes a pair of arms 120 (one only being shown) which are pivoted at their rearmost ends to the chassis 22 by transverse pins 122 and which carry at their forwardmost ends the idler 46. An upstanding crank 124 on each arm 120, respectively, adjacent its pin 122, receives a slip collar 126 that is in turn connected to a tension spring 128 rigidly secured at its forwardmost end to the chassis 22.

Figure 6:
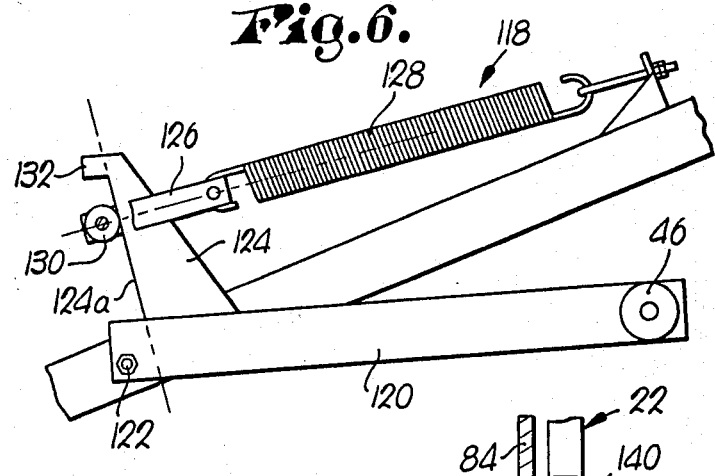
FIG. 6 is an enlarged, schematic elevational view of a second form of the improved belt-tensioning assembly illustrated in FIGS. 3 and 4.
Figure 7:
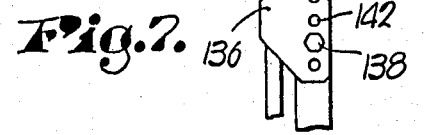
FIG. 7 is an enlarged, fragmentary front elevational view of the adjustable stop along the front of the machine which permits height adjustment of the rear end of the baling chamber.

As illustrated in detail in FIG. 6, the slip collar 126 carries an antifriction roller 130 that engages and rides along the inclined rear edge 124a of the crank 124 so as to permit the collar 126 to be displaced toward and away from the arm 120 between inner and outer extreme positions as illustrated in FIGS. 2 and 1, respectively. The arm 120 itself serves as an inner stop for the collar 126, while a rearwardly projecting ear 132 on the crank 124 adjacent its upper terminus serves as an outer stop for the collar 126. Slipping the collar 126 along the crank 124 during swinging movement of the arm 120 serves to maintain the spring tension on web 40 substantially uniform beyond a certain point in the swinging cycle of the arm 120. Note that when the chamber 30 is in its bale-starting configuration (FIG. 1), the collar 126 is in its outermost position against the ear 132, while, when the bale is full-grown (FIG. 2), the collar 126 is in its innermost position against the arm 120.

In FIG. 1 the chamber 30 has been illustrated in a typical bale-starting configuration. However, that configuration may be selectively varied to accommodate changes in crop conditions and variations in the types of crops being baled. To this end, the corner 80 may be adjusted upwardly or downwardly such as to increase or decrease the height of the rear end of the chamber 30 by virtue of an adjustable stop for each arm 84 of the retainer 82. Such stops may take the form of the plate-like device 134 which is bolted to the machine chassis 22 along the front of one side thereof. Such a device 134 is illustrated in detail in FIG. 7 wherein it may be seen that a laterally projecting shoulder 136 is disposed in the path of travel of the corresponding arm 84 to limit downward swinging of the latter. The vertical position of the shoulder 136 and, thus, the height of the corner 80 above the floor of the chamber 30, may be varied by inserting the screws 138 and 140 into a pair of holes selected from a vertical series of the holes 142 in the device 134. Such vertical adjustment of the device 134 is most easily carried out when the arm 84 is raised above the device 134, such as by the partially formed bale within the chamber 30.

The corner 80 may also be adjusted fore-and-aft so that its position is rearwardly or forwardly of the position illustrated in FIG. 1. This is accomplished by providing a number of longitudinally spaced openings 144 at the forwardmost ends of arms 84 into which the pins or bolts 86 may be inserted. In this manner the effective length of each arm 84 from its pivot point 86 may be varied, consequently displacing the corner 80 a corresponding amount.

OPERATION

In general, the machine 20 of the present invention forms a bale in much the same manner as conventional machines. That is, crop material is continuously tumbled and coiled up within the chamber 30 while additional material is supplied thereto by the pickup 24 as the machine 20 advances along a crop windrow. Compacting pressure against the bale is supplied by the webs 40 and 60 as the bale grows in diameter, such that a satisfactorily dense end product is achieved. While the chamber 30 is initially generally rectangular in cross-sectional configuration as illustrated in FIG. 1, that shape is progressively eliminated as the bale increases substantially in size toward the finished product as illustrated in FIG. 2. Thereafter, the rear part of the chassis 22, including the idlers 48, 50, 52 and 54, may be swung as a unit upwardly and rearwardly about a pivot not shown for the purpose of permitting discharge of the bale.

When the chamber 30 is in its bale-starting configuration as illustrated in FIG. 1, material fed rearwardly by the rollers 32, 34 and 36 encounters the substantially upright and upwardly moving web stretch 38 such that the material is immediately lifted. There is no opportunity for the material to become wedged between the rearmost roller 36 and the idler 54 as has heretofore been experienced on conventional machines. Any tendency for material to follow the rearmost roller 36 on around in its counterclockwise rotation is immediately overcome by the upwardly moving web stretch 38 which effectively strips the material from roller 36.

The material lifted by the stretch 38 toward corner 80 is thereupon engaged by the forwardly moving web stretch 58 to induce forward tumbling and initiate coiling up of the bale. Further growth of the bale is carried out in the usual manner as explained above, with the distinct corner 80 gradually disappearing as the retainer 82 is raised by the growing bale.

It has been found that where the crop material is relatively dry and light, the best bale-starting is achieved with the corner 80 relatively closer to the floor of the chamber 30 than in the case where the material is relatively damp and heavy. Once the retainer 82 has been raised sufficiently to clear the limit device 134, the latter may be adjusted upwardly or downwardly as necessary or desirable to change the height of the corner 80 in accordance with the crop situation at hand. Similarly, in certain crop conditions it has been found desirable to have the corner 80 further forwardly than in others. Removal and reinsertion of the pin 86 in an appropriate opening 144 permits the retainer 82 to be displaced fore-and-aft to suitably position the corner 80.

ALTERNATIVE EMBODIMENT

Figure 10:
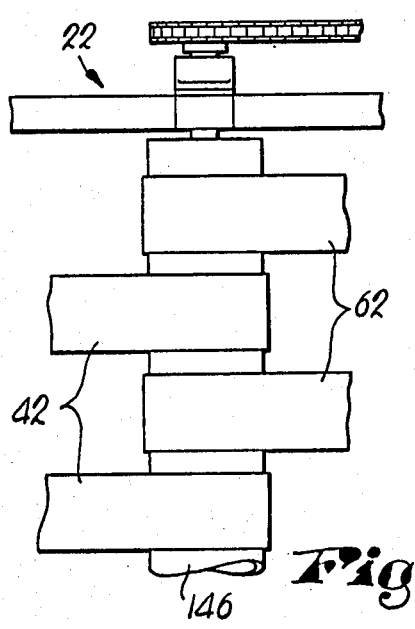
FIG. 10 is an enlarged, fragmentary top plan view of the single guide roller at the top of the machine about which belts of both systems are looped.
Figure 8:
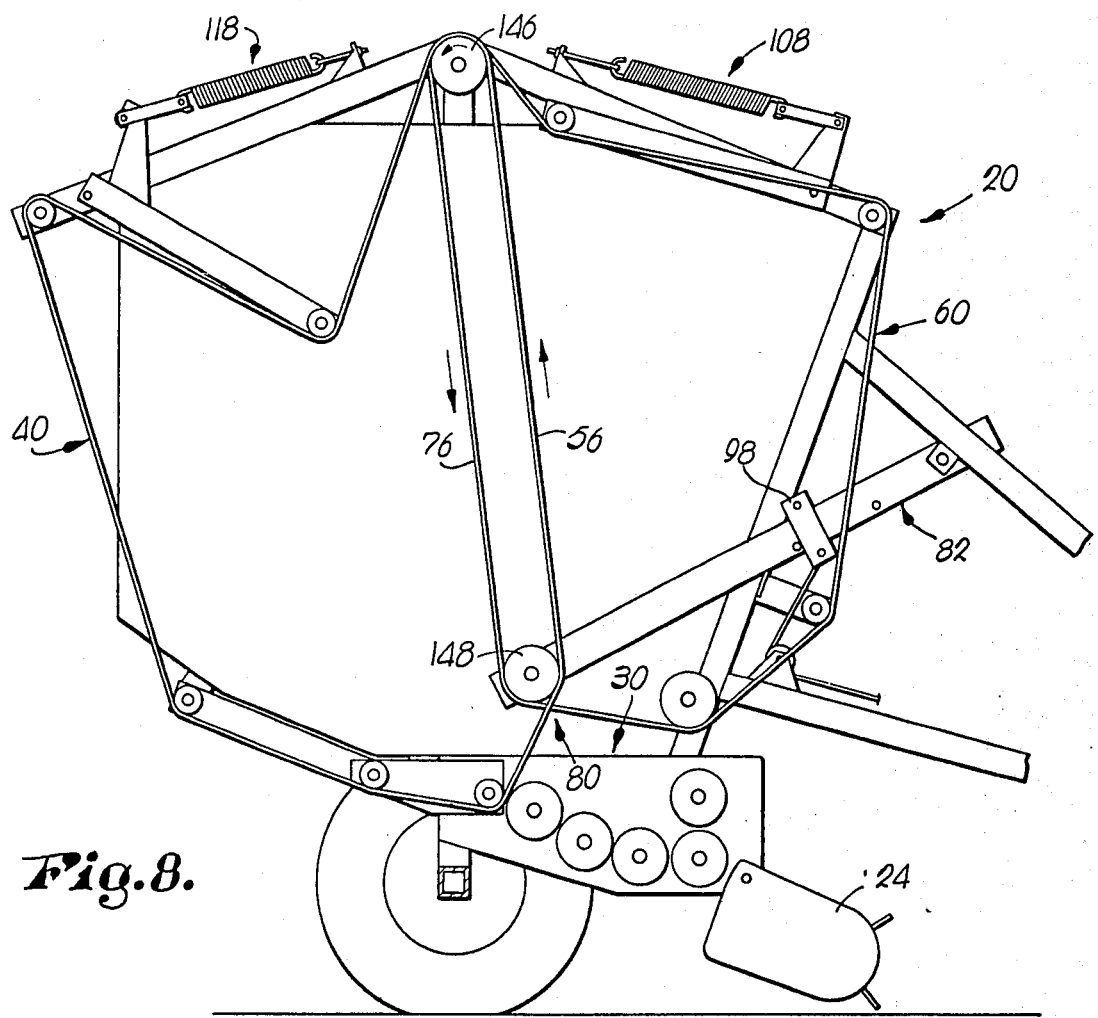
FIG. 8 is a schematic, vertical cross-sectional view of a second type of machine employing the principles of the present invention and having a slightly different belt configuration.
Figure 9:
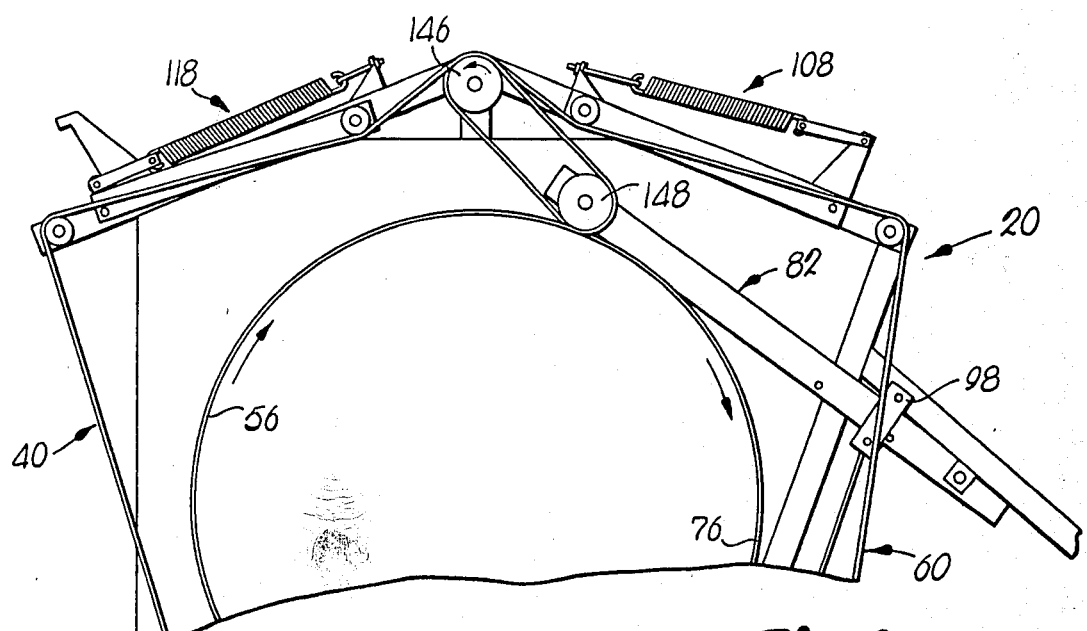
FIG. 9 is a fragmentary view thereof illustrating the condition of the machine when the bale is fully grown.

In FIGS. 8, 9 and 10 the machine 20 is provided with a slightly different web wrapping arrangement, although it will be appreciated that the basic principles of the present invention are the same as hereinabove described with respect to the embodiment of FIGS. 1-7. The differences lie in the fact that the web stretch 56 of the rear web 40 forwardly overlaps the rear stretch 76 of the front web 60. While in the embodiment of FIGS. 1-7 the stretch 56 was disposed slightly behind stretch 76, those positions have been reversed in the embodiment of FIGS. 8-10 through the use of a common upper guide roller 146 for the webs 60 and 40 at the center of the machine 20, and a common lower guide roller 148 for the webs on the retainer 82. The webs 40 and 60 are looped about the roller 146 in opposite directions so that the counterclockwise rotating roller 146 causes the stretch 76 to move downwardly and the stretch 56 to move upwardly. Similarly, the webs 40 and 60 are looped around the guide roller 148 in opposite directions, all of which has little or no effect upon the configuration of the chamber 30 and the formation of the corner 80. However, this arrangement does permit the use of fewer guide rollers while achieving substantially the same net result, thereby lowering costs.

The oppositely looped arrangement of the webs 40 and 60 about the roller 146 is well illustrated in FIG. 10 wherein it may also be seen that the belts 62 of the front web 60 are spaced further apart than in the first embodiment so as to provide clearance for the interspersed belts 42 of the rear web 40.

It should be emphasized that the webs 40 and 60 may take several different forms and yet remain well within the concepts of my present invention. For example, they need not consist of spaced-apart belts as illustrated. Instead, they may conceivably be broad, flat aprons or laterally spaced chains interconnected by slats. Furthermore, it is not necessary that the webs 20 and 40 be of the same construction. For example, one may consist of flexible belts and the other of chains and slats. In this event it is preferred that the belts be utilized on the rear web 40 and that the chains and slats be utilized on the front web 20. Of course, where the webs 20 and 40 are to be other than laterally spaced belts, it will be necessary to utilize the first embodiment wherein separate upper guide rollers 44 and 64 are available.

Having thus described the invention, what is claimed as new and desired to be secured by Letters Patent is:

1. In a machine having a frame and apparatus for applying compactive pressure to a cylindrical crop bale while the same is being formed within the machine, the improvement in said apparatus comprising:
    a tension arm mounted on said frame for swinging movement about an axis transverse to the arm,
    said arm being operable to transmit progressively increasing compactive pressure to the bale as the latter grows diametrically and the arm is swung from a starting end of its path of travel toward a finishing end of its path of travel corresponding to full bale size;
    a spring for resisting said movement of the arm whereby to supply said compactive pressure,
    said spring having an anchor point at one end thereof with said frame; and
    a slip connection on the other end of said spring operably coupling the same with the arm,
    said spring being so oriented with respect to said arm that shortly before the arm reaches said finishing end of its path of travel, the slip connection slips in a direction to prevent further increase in the compactive pressure applied to the bale notwithstanding continued swinging of the arm toward said finishing end of its path of travel,
    said arm having a surface and a first and a second stop spaced apart along said surface,
    said first stop being closer than said second stop to said anchor point of the spring when the arm is at said starting end of its path of travel, and said second stop being closer than said first stop to said anchor point of the spring when the arm is at said finishing end of its path of travel,
    said surface being disposed to shift from an acute angle with the line of force from said spring to an obtuse angle with the line of force from said spring as the arm swings from the starting end of its path of travel to the finishing end of its path of travel,
    said slip connection including means movable along said surface by said spring from said first stop as said surface of the arm shifts to said obtuse angle with the line of force from said spring and the arm approaches said finishing end of its path of travel.

2. In a machine as claimed in claim 1, wherein said surface extends along said arm generally radially from said axis.

3. In a machine as claimed in claim 1, wherein said arm is provided with a lever projecting laterally therefrom, said surface extending along said lever.

* * * * *